United States Patent
Brucker et al.

(10) Patent No.: US 6,378,895 B1
(45) Date of Patent: Apr. 30, 2002

(54) INFLATABLE PROTECTIVE CUSHION FOR SIDE IMPACT PROTECTION

(75) Inventors: Roland Brucker, Schwäbisch Gmünd; Kai Buerkle, Remseck, both of (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 0 days.

(21) Appl. No.: 09/536,901

(22) Filed: Mar. 28, 2000

(30) Foreign Application Priority Data

Mar. 29, 1999 (DE) ..................... 299 05 770 U

(51) Int. Cl.⁷ ............................. B60R 21/22
(52) U.S. Cl. ............... 280/730.2; 280/730.1; 280/729; 280/743.1
(58) Field of Search .......... 280/730.2, 730.1, 280/729, 740, 742, 743.1; 5/713

(56) References Cited

U.S. PATENT DOCUMENTS

| | | | | |
|---|---|---|---|---|
| 3,606,377 A | * | 9/1971 | Martin | 280/150 AB |
| 3,761,112 A | * | 9/1973 | Usui et al. | 280/150 AB |
| 3,840,246 A | * | 10/1974 | McCullough, Jr. et al. | 280/150 AB |
| 3,907,328 A | * | 9/1975 | Werman | 280/150 AB |
| 5,676,395 A | * | 10/1997 | Oe et al. | 280/730.2 |
| 5,899,491 A | * | 5/1999 | Tschaeschke | 280/730.2 |
| 6,056,316 A | * | 5/2000 | Yamaji et al. | 280/730.2 |
| 6,062,143 A | * | 5/2000 | Grace et al. | 102/530 |
| 6,106,000 A | * | 8/2000 | Stewart | 280/728.2 |
| 6,123,355 A | * | 9/2000 | Sutherland | 280/728.2 |
| 6,164,688 A | * | 12/2000 | Einsiedel et al. | 280/730.2 |
| 6,176,517 B1 | * | 1/2001 | Hamilton et al. | 280/736 |
| 6,199,898 B1 | * | 3/2001 | Masuda et al. | 280/730.2 |
| 6,213,499 B1 | * | 4/2001 | Khoudari et al. | 280/730.2 |
| 6,237,942 B1 | * | 5/2001 | Swann | 280/730.2 |

FOREIGN PATENT DOCUMENTS

JP 407275090 A * 10/1995 .......... A47C/27/08

* cited by examiner

*Primary Examiner*—Lanna Mai
*Assistant Examiner*—Paul Royal, Jr.
(74) *Attorney, Agent, or Firm*—Tarolli, Sundheim, Covell, Tummino & Szabo L.L.P.

(57) ABSTRACT

An inflatable protective cushion (10) for the protection of vehicle occupants against side impact, in particular in the head and shoulder region, comprises a gas inlet pipe (18). The gas inlet pipe extends over a substantial portion of the extent of the protective cushion (10). A branch line (24) is directed from the gas inlet pipe (18) inside the protective cushion (10) to a region of the protective cushion (10) a distance away from the gas inlet pipe (18), whereby selected portions of the cushion can be inflated more rapidly.

9 Claims, 1 Drawing Sheet

INFLATABLE PROTECTIVE CUSHION FOR SIDE IMPACT PROTECTION

The invention relates to an inflatable protective cushion for the protection of vehicle occupants against side impact, in particular in the head and shoulder region.

BACKGROUND OF THE INVENTION

Such protective cushions comprise an elongate inflatable bag that extends in the inflated condition over a large area over the region of the side windows in the vehicle from the A-column via the B-column to the C-column. The folded bag is accommodated along a roof edge situated above the side doors. A gas distribution pipe extends within and substantially over the entire length of the bag and is provided with numerous gas outlet openings which are distributed across the length of the gas distribution pipe. An end of the gas distribution pipe extendeds out from the bag and is connected to a pressurized gas source or to a gas generator. Within the bag, chambers are defined by seams, layers of fabric woven with each other or limiting straps, the form of which in the inflated bag is determined by the protective function which is aimed at. These chambers are not connected directly to the gas distribution pipe, but rather are filled indirectly through the internal pressure occurring within the bag on inflation. The inflation of the bag with the various chamber regions formed therein is a dynamic process in the course of which the pressure and volume distribution changes continuously. Through an indirect filling of the various chamber regions of the protective cushion, as is conventional, this process is scarcely able to be controlled.

BRIEF SUMMARY OF THE INVENTION

The present invention provides an inflatable protective cushion wherein an optimum pressure and volume distribution can be achieved within the bag, and different chamber regions can be filled selectively. According to the invention, at least one branch line extends and is directed from the gas distribution pipe inside the inflatable bag to a portion of the bag spaced from the gas distribution pipe. Through this branch line, the respective region of the bag is filled directly, the degree of filling being determined by the length and the cross-section of the branch line. Preferably, each chamber region of the protective cushion which is to be filled in a reproducibly predetermined manner, is to have associated with it its own branch line of suitable length and suitable cross-section. As therefore all chamber regions within the bag can be filled with an optimum filling pressure and filling volume, the overall filling volume of the bag can be reduced, and an improved protective effect can nevertheless be achieved. Through such branch lines also the unfolding behavior of the bag can be improved, just as the opening behavior of the covering behind which the bag is stowed in the state of rest.

The branch line or branch lines are preferably formed from a flexible material and can therefore be folded or collapsed together with the inflatable bag of the protective cushion.

In order to ensure an introduction of gas directly into specific portions or selected chamber regions of the bag, the branch lines are each fixed in position inside the bag.

BRIEF DESCRIPTION OF THE DRAWINGS

Further features and advantages of the invention will be apparent from the following description and from the drawing to which reference is made. In the drawing.

DETAILED DESCRIPTION OF THE PREFERRED EMBODIMENTS

Figure 1:
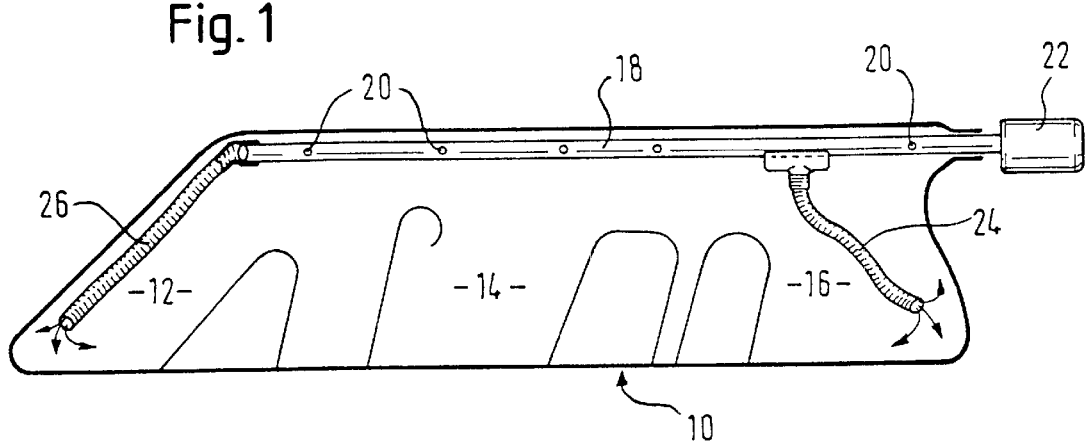
FIG. 1 shows a diagrammatic top view of a protective cushion in an activated state.

The inflatable protective cushion shown in FIG. 1 for the protection of vehicle occupants against side impact comprises an elongate inflatabel bag which, in the inflated condition shown in FIG. 1, covers the side windows of the vehicle from the A-column via the B-column to the C-column. Within the bag, which is designated generally by 10, chamber regions 12, 14, 16 are delimited by fabric pieces woven with each other or interconnected in another manner, e.g. by seams. Over the entire length of the inflated bag 10, a gas distribution pipe 18 extends along an upper edge, which pipe 18 is provided with outlet openings 20 distributed over its length. An end of the gas distribution pipe 18 leading out from the bag 10 is connected to a (e.g. pyrotechnic) gas generator 22.

Next to the chamber region 16 a branch line 24 is connected to the gas distribution pipe 18. This branch line 24 consists of a flexible material and can therefore be folded or collapsed together with the flexible wall of the bag 10. As can be seen from FIG. 1, the branch line 24 extends far into the chamber region 16. In order to ensure a defined position of the orifice opening of the branch line 24 within the chamber region 16, the branch line is fixed in position against the wall of the bag.

A flexible gas pipe, 26 in FIG. 1, is also connected to the free inner end of the gas distribution pipe 18. This gas pipe extends up to close to the lower boundary of the chamber region 12 and is likewise fixed in position there.

If required, further branch lines are provided, for example adjacent to the chamber region 14.

On activation of the protective cushion, the bag 10 is filled both through the outlet openings 20 and also through the flexible pipes 24 and 26. By the provision of the flexible pipes 24, 26 the chamber regions 12, 16 within the bag 10 can be inflated selectively and rapidly and to a controlled amount of pressure.

Figure 2:
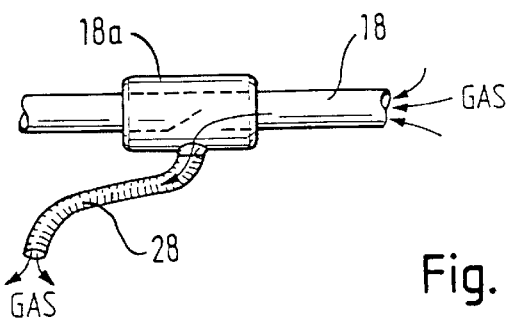
FIG. 2 shows part of a gas distribution pipe with a branch line leading away therefrom.

In the embodiment shown in FIG. 2, a branch line 28 is connected to the outer periphery of the gas distribution pipe 18. To improve the flow characteristics, the gas distribution pipe 18 has a widening 18a at the branching location.

Figure 3:
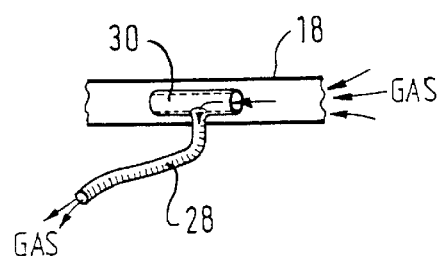
FIG. 3 partially shows another embodiment of the branch.

In the embodiment shown in FIG. 3, the branch line 28 is connected by means of a branching connection 30 situated inside the gas distribution pipe 18.

Figure 4:
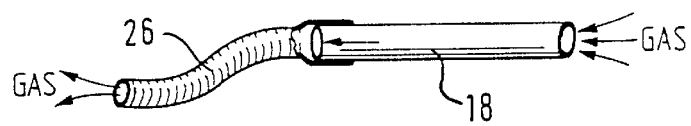
FIG. 4 is a sketch showing a flexible gas pipe which leads away from one end of the gas distribution pipe.

FIG. 4 shows the connection of the flexible gas pipe 26 at the free end of the gas distribution pipe 18. As can be seen from FIG. 4, the flexible gas pipe can be placed simply onto the end of the gas distribution pipe 18.

Figure 5:
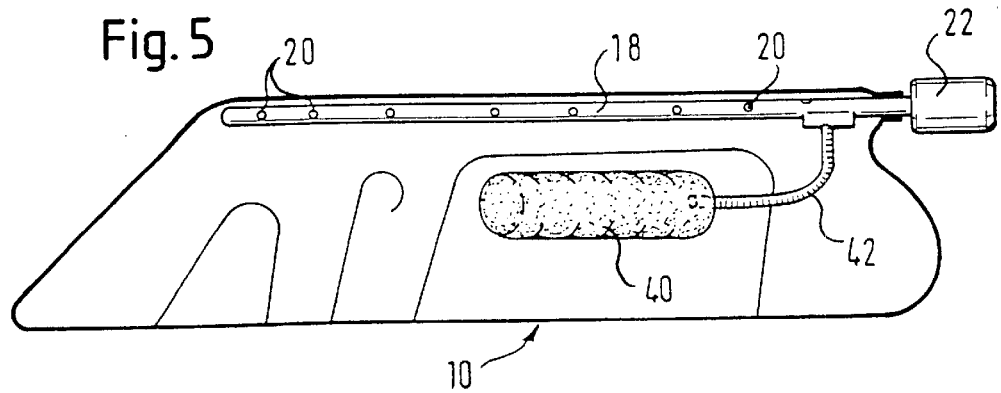
FIG. 5 shows a diagrammatic elevation of another embodiment of the protective cushion in an activated state.

In the embodiment shown in FIG. 5, a chamber 40, closed on all sides, is defined within the bag 10, which chamber 40 is connected to the gas distribution pipe 18 through a branch line 42 of flexible material. The remaining volume of the bag is filled in a conventional manner through outlet openings 20 of the gas distribution pipe 18. In this embodiment, the total volume of the inflatable bag can be reduced without impairing the protective function.

What is claimed is:

1. An inflatable protective cushion for protection of vehicle occupants against side impact comprising an elongate inflatable bag and a gas distribution pipe extending all along an upper edge of said bag, said gas distribution pipe having an end extending out of said bag and connected to a gas generator, said inflatable protective cushion further comprising at least one branch line within said bag and connected to an intermediate portion of said gas distribution pipe and directed from said gas distribution pipe inside said bag to a portion of said bag spaced from said gas distribution pipe.

2. The protective cushion according to claim 1 wherein said branch line is constituted of a flexible material and can be folded together with said bag.

3. The protective cushion according to claim 2 wherein said branch line is fixed in position inside said bag.

4. The protective cushion according to claim 1 wherein said branch line opens into a chamber region delimited at least partially inside said bag.

5. The protective cushion according to claim 1 wherein said gas distribution pipe has outlet openings distributed across the length of said gas distribution pipe and a plurality of branch lines extending to different chamber regions of said protective cushion.

6. The protective cushion according to claim 1 wherein a flexible gas pipe is connected to a free end of said gas distribution pipe situated inside said bag, said flexible gas pipe being directed to a chamber region of said bag spaced from said gas distribution pipe.

7. The protective cushion according to claim 1 wherein at least one completely separated chamber is formed within said bag, a branch line extending from said gas distribution pipe to said separated chamber.

8. An inflatable protective cushion for protection of vehicle occupants against side impact comprising an elongate inflatable bag and a gas distribution pipe extending all along an upper edge of said bag, said inflatable protective cushion further comprising at least one branch line within said bag and connected to said gas distribution pipe and directed from said gas distribution pipe inside said bag to a portion of said bag spaced from said gas distribution pipe.

9. An inflatable protective cushion for protection of vehicle occupants against side impact comprising an elongate inflatable bag and a gas distribution pipe extending all along an upper edge of said bag, said inflatable protective cushion further comprising at least one branch pipe within said bag and connected to an intermediate portion of said gas distribution pipe and directed from said gas distribution pipe inside said bag to a portion of said bag spaced from said gas distribution pipe.

* * * * *